(12) United States Patent
Kristoff

(10) Patent No.: US 12,071,063 B2
(45) Date of Patent: Aug. 27, 2024

(54) METHOD FOR SECURING CARGO BOXES UPON THE BED OF A PICKUP TRUCK DEVICE FOR SECURING CARGO BOXES UPON THE BED OF A PICKUP TRUCK

(71) Applicant: David Louis Kristoff, Highland, IN (US)

(72) Inventor: David Louis Kristoff, Highland, IN (US)

( * ) Notice: Subject to any disclaimer, the term of this patent is extended or adjusted under 35 U.S.C. 154(b) by 25 days.

(21) Appl. No.: 18/089,687

(22) Filed: Dec. 28, 2022

(65) Prior Publication Data
US 2023/0415633 A1 Dec. 28, 2023

Related U.S. Application Data

(63) Continuation-in-part of application No. 17/849,616, filed on Jun. 25, 2022.

(51) Int. Cl.
*B60P 7/08* (2006.01)
(52) U.S. Cl.
CPC ........... *B60P 7/0823* (2013.01); *B60P 7/0807* (2013.01); *B60P 7/083* (2013.01); *B60P 7/0869* (2013.01)
(58) Field of Classification Search
CPC ...... B60R 7/0823; B60P 7/0807; B60P 7/083; B60P 7/0869
See application file for complete search history.

(56) References Cited

U.S. PATENT DOCUMENTS

| 6,783,311 | B2 * | 8/2004 | Sauerwald | B60P 7/0823 410/97 |
| 8,882,417 | B2 * | 11/2014 | Sauerwald | B60P 7/0823 410/100 |
| 8,974,158 | B1 * | 3/2015 | Hatch | B60P 7/0876 410/97 |

* cited by examiner

Primary Examiner — Robert Sandy
(74) Attorney, Agent, or Firm — Donald G. Flaynik

(57) ABSTRACT

A method for securing cargo boxes upon the bed of a pickup truck includes the steps of securing cargo rings to a structural portion of each inner side wall of the pickup truck; determining the distance separating adjacent cargo rings on each inner side wall; providing at least two strap members each having a longitudinal dimension greater than the distance separating cargo rings on a respective inner side wall, each of the two strap members having first and second portions, each portion having a hook end with a connecting hook secured thereto, the first portion having a cam buckle end integrally secured to a cam buckle, the second portion having a cam buckle end slidably secured to the cam buckle, resulting in the hook ends of each strap member being detachably secured to a respective cargo ring; whereby, cross straps detachably secured to strap rings secured to the strap members ultimately secure cargo boxes upon the bed of the pickup truck, and a tensile force vector imparted upon each strap member and extending parallel to the inner side walls of the pickup trick is reduced, thereby reducing the force urging together the cargo rings on each respective side wall of the pickup truck.

20 Claims, 12 Drawing Sheets

METHOD FOR SECURING CARGO BOXES UPON THE BED OF A PICKUP TRUCK DEVICE FOR SECURING CARGO BOXES UPON THE BED OF A PICKUP TRUCK

This Continuation-In-Part application is based on Utility application Ser. No. 17/849,616 filed on Jun. 25, 2022, which is based on Provisional Application No. 63/275,262 filed Nov. 3, 2021.

BACKGROUND OF THE INVENTION

1. Field of the Invention

This invention relates to a method and device for securing cargo boxes upon the bed or floor of a truck; and in particular to securing cargo boxes on the bed of a pickup truck via opposing strap members detachably secured to opposing inner side walls of the pickup truck, and via cross straps detachably secured to the opposing strap members.

2. Background of the Prior Art

Prior art devices and methods for securing cargo boxes upon the bed of a pickup truck include strap members having ratchet members and hook ends (see U.S. Pat. Nos. 8,272,821 and 8,882,417) that enable the straps to be detachably secured to cargo rings integrally joined to inner side walls of the pickup truck. The ratchet members are manually "activated" whereby all slack in each respective strap member is removed until each strap member is subject to a tensile stress that maintains the strap members substantially parallel to the respective side wall of the pickup truck, irrespective of a perpendicular force imparted upon the strap members via cross straps detachably secured to each strap member. The cross straps engage cargo boxes disposed upon the bed or floor of the pickup truck with a directional force intended to be sufficient to maintain the relative position of each cargo box upon the bed of the pickup truck when operating the pickup truck upon undulating roads or around tight bends.

A problem arises when an operator is driving the pickup truck upon undulating roads or around tight bends at speeds that increase the forces imparted upon the strap members and cross straps by the cargo boxes to magnitudes that, when added to the tensile stress generated by the ratchet members, result in one or both of the ratchet members releasing the respective strap member or allowing the strap member to "slip"; thereby releasing the cargo boxes secured upon the bed of the pickup truck or allowing the cargo boxes to slid upon the pickup truck bed, resulting in damage to the truck and/or injury to the truck driver and other proximate vehicles.

Further, the strap members of the prior art patents include apertures that removably receive hook ends of cross straps urging the cargo boxes upon the truck bed. When the cross straps are stretched to generate tensile force upon the cargo boxes after each cross-strap hook is secured to the apertures in the strap portion, the cross straps tend to rotate and twist thereby reducing the surface area of the cross strap that engages the top portion of the cargo boxes and correspondingly reducing the total force urging the bottom of the cargo boxes upon the bed of the truck, resulting in the cargo boxes being released and allowed to cause damage to the pickup truck, injury to the pickup truckdriver or damage to other vehicles.

A need exists for a method and device for securing cargo boxes upon a floor or bed of a truck without using a ratcheted connector to secure a strap member to cargo rings attached to inner side walls of truck. Further, there is a need for the strap member to include strap rings each having a linear portion integrally joined to the strap member, and the rings having an arcuate portion separated from the strap member; whereby, the ring separates hook portions of cross straps from the strap member after the cross straps have been stretched to secure cargo boxes to the bed or floor of the pickup truck when the hook portions of the cross straps engage the arcuate portion of the ring, thereby preventing the strap member and cross straps from twisting.

Further, a need exists for an alternative method and device for securing cargo boxes upon a floor or bed of a truck via strap members each including a first portion integrally secured to a connector member, and a second portion slidably secured to the same connector member; whereby, each strap member is adjustably secured to cargo rings attached to a respective inner side wall of the truck to enable a user to select an optimal longitudinal dimension for each strap member that is greater than the distance separating the cooperating cargo rings. The selected longitudinal dimension enables the user to separate a midportion of each strap member from a midpoint between the cooperating cargo rings, resulting in a reduction of a force vector extending parallel to a respective inner side wall of the truck that urges the cooperating cargo rings together. Strap members that are substantially the same length as the distance separating the cargo rings the strap members are detachably secured to are capable of bending or separating the cargo rings from the inner side wall of the truck when the truck is driven at excessive speeds or upon roads having "pot holes."

SUMMARY OF THE INVENTION

It is a principal object of the present invention to provide a method and device for securing cargo boxes upon the bed of a pickup truck. A feature of the method and device is the securing of a strap member to each inner side wall of the pickup truck via cargo rings, whereby connecting hooks integrally joined to end portions of each strap member provide a length between outer ends of the connecting hooks greater than the distance separating the cargo rings on each side wall of the truck, resulting in a sag in the mid-portion of the strap member when connected to the cargo rings. An advantage of the method and device is that an acute angle of a force vector is formed relative to the surface of the inner side walls of the truck, thereby reducing the force lineally aligned with the cargo rings and correspondingly reducing the force generated by the tensile force of the cross straps, resulting in the reducing of the force urging the cargo rings toward each other that would otherwise damage the cargo rings.

Another object of the present invention is to provide a method and device for securing cargo boxes upon the bed of a pickup truck that prevents tensile force imparted upon the strap member from being reduce by slippage or totally released. A feature of the method and device is eliminating ratchet connections for the strap members to the cargo rings. An advantage of the method and device is that the connecting hooks will not release the strap members from the cargo rings, irrespective of the force generated by cross straps connected to the strap members. Another advantage of the method and device is that by preventing the sudden release of the tension generated by ratchet straps upon restrained cargo boxes, movement of the cargo boxes is avoided that could damage the inner side walls of the pickup truck and/or cause injury to the driver of the pickup truck.

Yet another object of the present invention is to provide a method and device for securing cargo boxes upon the bed of a pickup truck that provides strap rings integrally secured to and vertically positioned upon strap members. A feature of the method and device is the integral securing of a base portion of the strap rings between two layers of the strap members, whereby an arcuately configured retaining loop of the strap rings is disposed vertically, thereby enabling the "peak" portions of the arcuately configured retaining loops to be displaced from a centerline of the strap members to detachably receive end portions of cross straps without causing the strap members or the cross straps twisting or rotating due to the strap rings being separated from the end portion hooks of the cross straps and from the strap members. An advantage of the method and device is that preventing the strap members and cross straps from twisting, correspondingly reduces damage to the strap members and maintains the entire surface area of the cross straps upon the top portions of the cargo boxes, thereby increasing the total force urging the bottom portions of the cargo boxes upon the bed of the pickup truck.

Still another object of the present invention is to provide an alternative method and device for securing cargo boxes upon the bed of a pickup truck that includes adjustable length strap members that receive and minimize a tensile force vector extending parallel to a corresponding side wall of the pickup truck. A feature of the alternative method and device is opposing strap members each including a first portion integrally secured to a slide connector (cam buckle), and a second portion slidably secured to the cam buckle. Another feature of the alternative method and device is that the first portion includes a hook end integrally joined to a connecting hook that detachably secures to a cooperating cargo ring, and a cam buckle end integrally joined to the cam buckle. Still another feature of the alternative method and device is that the second portion includes a hook end integrally joined to a connecting hook that detachably secures to a cooperating cargo ring, and a cam buckle end slidably joined to the cam buckle. An advantage of the alternative method and device is that the cam buckle enables a user to select a second portion length that provides an optimal distance separating a mid-portion of the first portion strap member from an inner side wall of the truck; whereby, a force vector parallel to the side wall of the pickup truck is minimized; the force vector generated via cross straps connected to the first portion of each strap member, the cross straps ultimately urging together respective cargo rings (secured to the side walls of the pickup truck) that detachably receive end portions of the strap members.

Yet another object of the present invention is to provide and alternative method and device for securing cargo boxes upon the bed of a pickup truck that includes a strap member having a first portion with multiple strap rings for detachably receiving cross straps that engage and secure cargo boxes to the bed of a pickup truck. A feature of the alternative method and device is to provide a first portion of the strap members having a longitudinal dimension relatively greater than the longitudinal dimension of the second portion of the strap members. Another feature of the alternative method and device is to adjust the dimension of the second portion whereby a midportion of the first portion is substantially aligned with a midpoint between respective cargo rings secured to the same inner side wall of the pickup truck, whereby the aligned midportion and midpoint are perpendicular (when taking a top view of the bed of the pickup truck) to the inner side wall of the pickup truck with the midportion separated a distance of about eight inches from the side wall. An advantage of the alternative method and device is that the force imparted upon and urging together the cargo rings via the cross straps is reduced due to the acute angle formed between the outer ends of the first and second portions of the strap members and the inner side walls of the pickup truck, when compared to the outer ends of the prior art strap members being parallel to the respective pickup truck inner side walls.

Another object of the present invention is to provide an alternative method and device for securing cargo boxes upon the bed of a pickup truck that includes strap members having adjustable length second portions slidably secured to cam buckles that receive an end portion of an inner end of each strap member; whereby, an increased force imparted upon the strap members via cross straps secured to the strap members (the cross straps securing cargo boxes upon the bed of a pickup truck), correspondingly increases the grasping force of the cam buckles upon the strap members. A feature of the alternative method and device is a second portion of each strap member that includes an outer end connecting hook secured to a cargo ring integrally joined to a side wall of the pickup truck. The second portion of each strap member further includes the inner end looping around an end portion of a pivot portion of the cam buckle; the inner end continuing through manually open teeth members of the pivot portion and a base portion of the cam buckle until the teeth members of the pivot portion and the base portion forcibly engage the second portion of each strap member. An advantage of the alternative method and device is that as the tensile force exerted upon the strap members via the cross straps increases, the pivot portion of the cam buckle pivots whereby the teeth of the cam buckle are forcibly urged into the inner end of each second portion of each strap member, thereby cooperatively urging the teeth of the base portion into the inner end of each second portion, resulting in the increased grasp of the cam buckle upon the inner end for maintaining the position of the cargo boxes upon the bed of the pickup truck.

BRIEF DESCRIPTION OF THE DRAWINGS

Objects, advantages and novel features of the present invention, as well as details of an illustrative embodiment thereof, will be understood from the following detailed description and attached drawings, wherein.

DESCRIPTION OF THE PREFERRED EMBODIMENT

Figure 1:
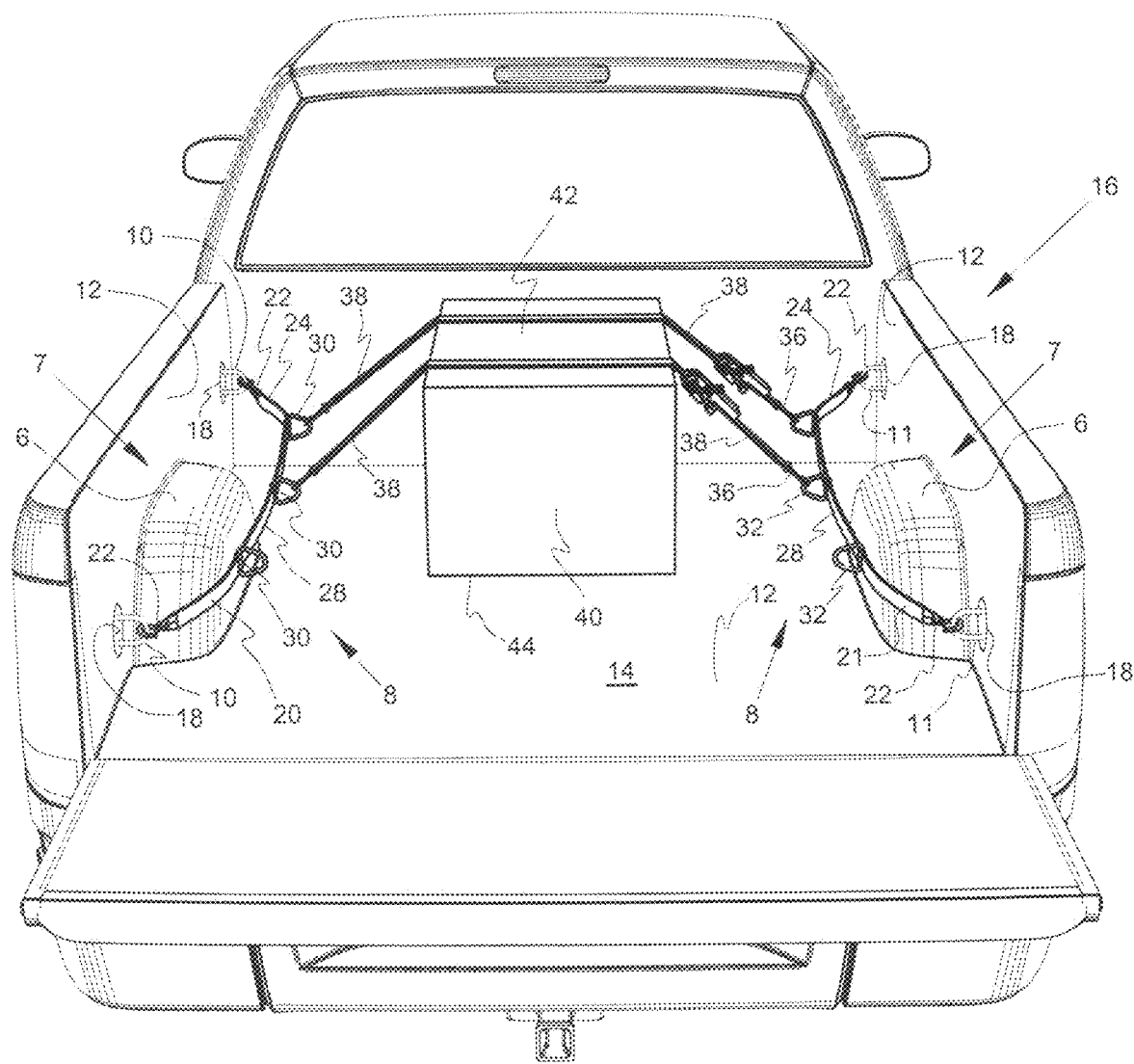
FIG. 1 is a back perspective view of a pickup truck having a device for securing cargo boxes upon the bed of the pickup truck; the device includes two opposing strap members detachably secured to cargo rings attached to both inner side walls of the pickup truck, and multiple cross straps connected to the strap members that engage the cargo boxes in accordance with the present invention.

Referring now to the drawings, a method and device 8 for securing cargo boxes in the bed of a pickup truck in accordance with the present invention includes determining the distance separating pairs of cargo rings 10 and 11 previously installed and secured to each inner side wall 12 of a bed 14 of a pickup truck 16. Although the pairs of cargo rings 10 and 11 are may be factory installed, the user of the method may be required to secure a pair of cargo rings 10 and 11 to a structural portion 18 of each inner side wall 12 of the bed 14 of the pickup truck 16. The user installed cargo rings 10 and 11 should be substantially the same as the factory installed cargo rings 10 and 11. The cargo rings 10 and 11 are secured to the inner side wall 12 about two inches above top portions 6 of wheel wells 7, thereby preventing engagement between the wheel wells 7 and first and second strap members 20 and 21 that ultimately connect to respective pairs of the cargo rings 10 and 11.

Figure 4:
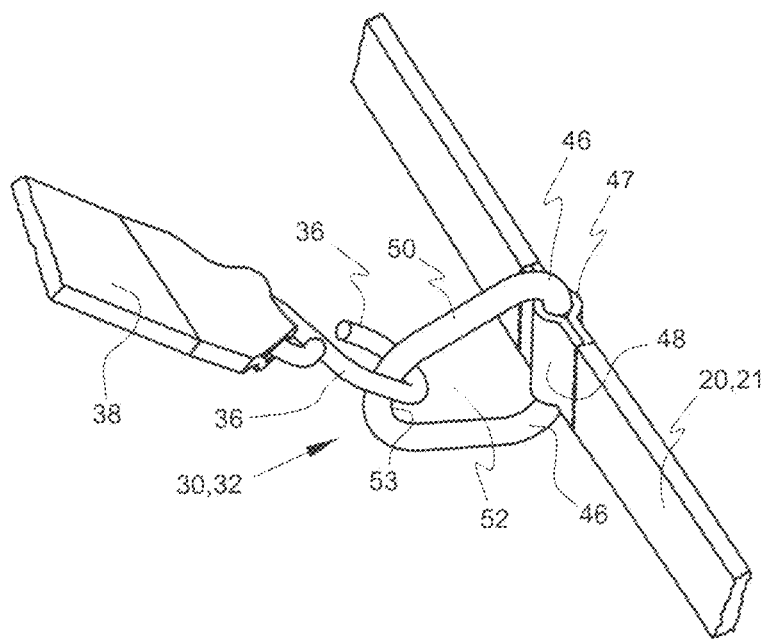
FIG. 4 is a perspective view of a strap ring integrally secured between two layers of material that forms the strap member.
Figure 9:
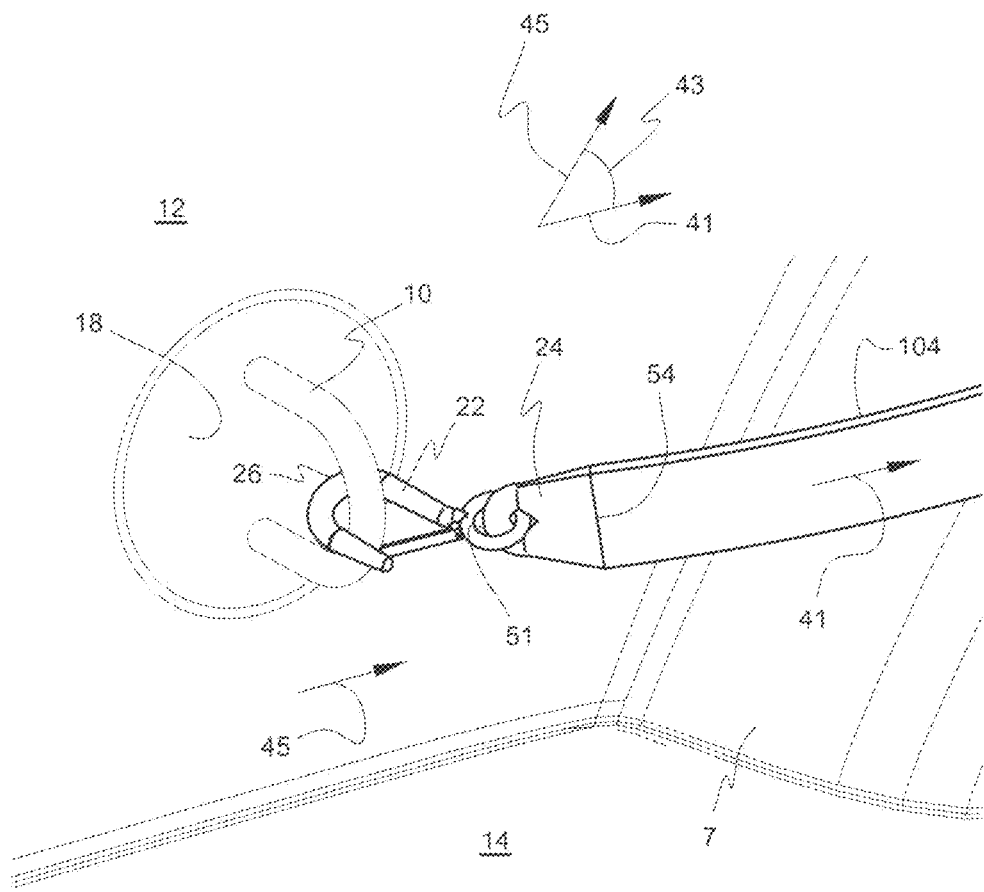
FIG. 9 is perspective view of the outer portion of the strap member of FIG. 3, but with an alternative method and device detachably secured to a cargo ring in accordance with the present invention.
Figure 10:
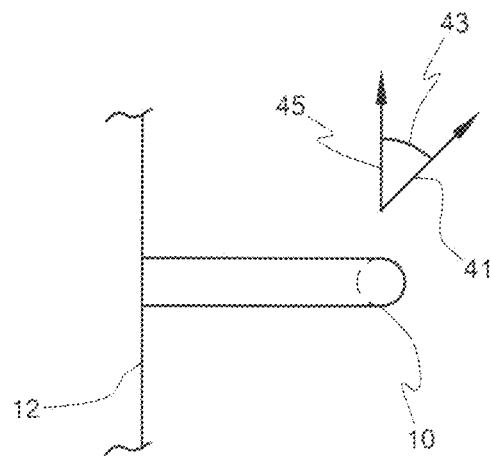
FIG. 10 is a top elevation view of force vectors imparted upon the end portion of the strap member of FIG. 9.
Figure 11:
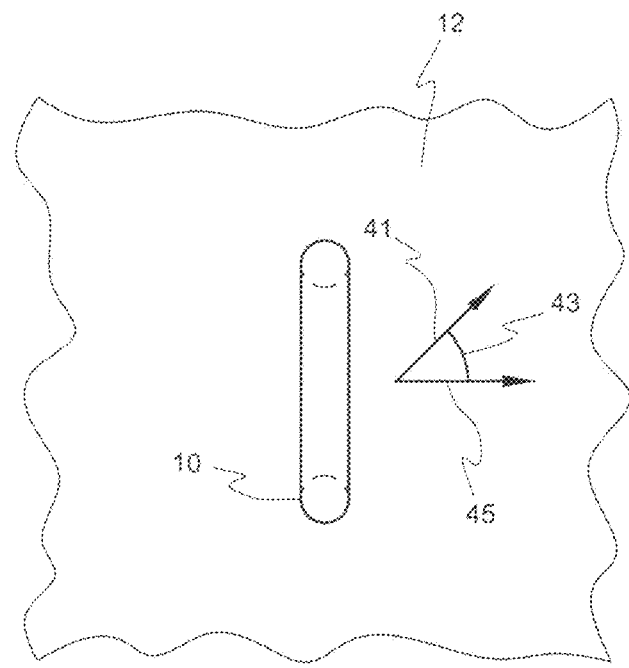
FIG. 11 is a front elevation view of FIG. 10.

The method requires the user to determine the distance separating cooperating pairs of the cargo rings 10 and 11. After obtaining the distance, the user must provide connecting hooks 22 that are secured to end portions 24 of the strap members 20 and 21. The user has the option of selecting a connecting hook 22 with an annular portion 23 (FIG. 2a) or with a rectangular base 25 (FIG. 2b) for either end portion 24 of the strap members 20 and 21. The preferred orientation of the strap members 20 and 21 is a vertical position as depicted in FIG. 2b, but the orientation of the cargo rings 10 and 11 can vary, whereby the connecting hook 22 having an annular portion 23, (FIGS. 2a and 9) is required. Further, a swivel (well known to those of ordinary skill in the art) can be integrally joined between the annular portion 23 and of the connecting hook 22 and the end portion 24 of the strap members 20 and 21; whereby the annular portion 23 and the strap members 20 and 21 are free to rotate to any position, resulting in the strap members 20 and 21 rotating from a vertically orientation to an angled position that cooperates with cross straps 38 angularly extending from a top wall 42 of a cargo box 40, when cross straps 38 are secured to the strap rings 30 and 32 and a tensile force is urged upon the cross straps 38 (see FIGS. 1 and 4).

The longitudinal dimension of each strap member 20 and 21 with the attached connecting hooks 22 must have a length between end portions 26 of the connecting hooks 22 that is relatively longer (preferably between six and ten inches) than the distance separating a cooperating pair of cargo rings 10 and 11. The lengths of the strap members 20 and 21 with the connecting hooks 22 enables each strap member 20 and 21 to be secured to a corresponding inner side wall 12 of the pickup truck 16, whereby each strap member 20 and 21 sags at a midportion 28 that is ultimately disposed at a predetermined distance from a respective side wall 12 of the truck 16 when a tensile force is ultimately applied to the strap members 20 and 21.

Before connecting the strap members 20 and 21 to the connecting hooks 22, a preselected quantity of strap rings 30 must be integrally secured to strap member 20, and the same quantity of strap rings 32 should be integrally secured to strap member 21. The preferred arrangement of the strap rings 30 and 32 is to position the strap rings 30 and 32 opposite each other, whereby cross straps 38 connected to the strap rings 30 and 32 are orientated perpendicular to the side walls 12 of the truck 16 when each cross strap 38 engages a top portion 42 of cargo boxes 40. Further, multiple cross straps 38 can be connected to each strap ring 30 and 32, thereby enabling cross straps 38 to be orientated perpendicularly and at acute angles to the side walls 12 of the truck 16, resulting in more force from multiple cross straps 38 being applied to top portions 42 of cargo boxes 38 for maintaining bottom portions 44 of the cargo boxes 40 upon the bed 14 of the truck 16.

The cross straps 38 are well known to those of ordinary skill in the art and include, but not limited to ratchet straps, bungee cords, ropes and combinations thereof. The cross straps 38 are adjustable in length and include end portions 36 that detachably secure to the strap rings 30 and 32. After the cross straps 38 are connected to cooperating strap rings 30 and 32, the cross straps 38 lengths are forcibly "stretched" to generate sufficient tensile force that removes the sag from the midportion 28 from the strap members 20 and 21, thereby forcibly separating the strap members 20 and 21 from corresponding inner side walls 12 of the pickup truck 16. The generated tensile force from the cross straps 38 ultimately results in the cross straps 38 forcibly engaging the top portions 42 of the cargo boxes 40 and correspondingly urging the bottom portions 44 of the cargo boxes 40 upon the bed 14 of the pickup truck 16, thereby maintaining the position of the cargo boxes 40 upon the bed 14 of the pickup truck 16, irrespective of the vertical movement of the bed 14 or the directional changes of the pickup truck 16.

Figure 3:
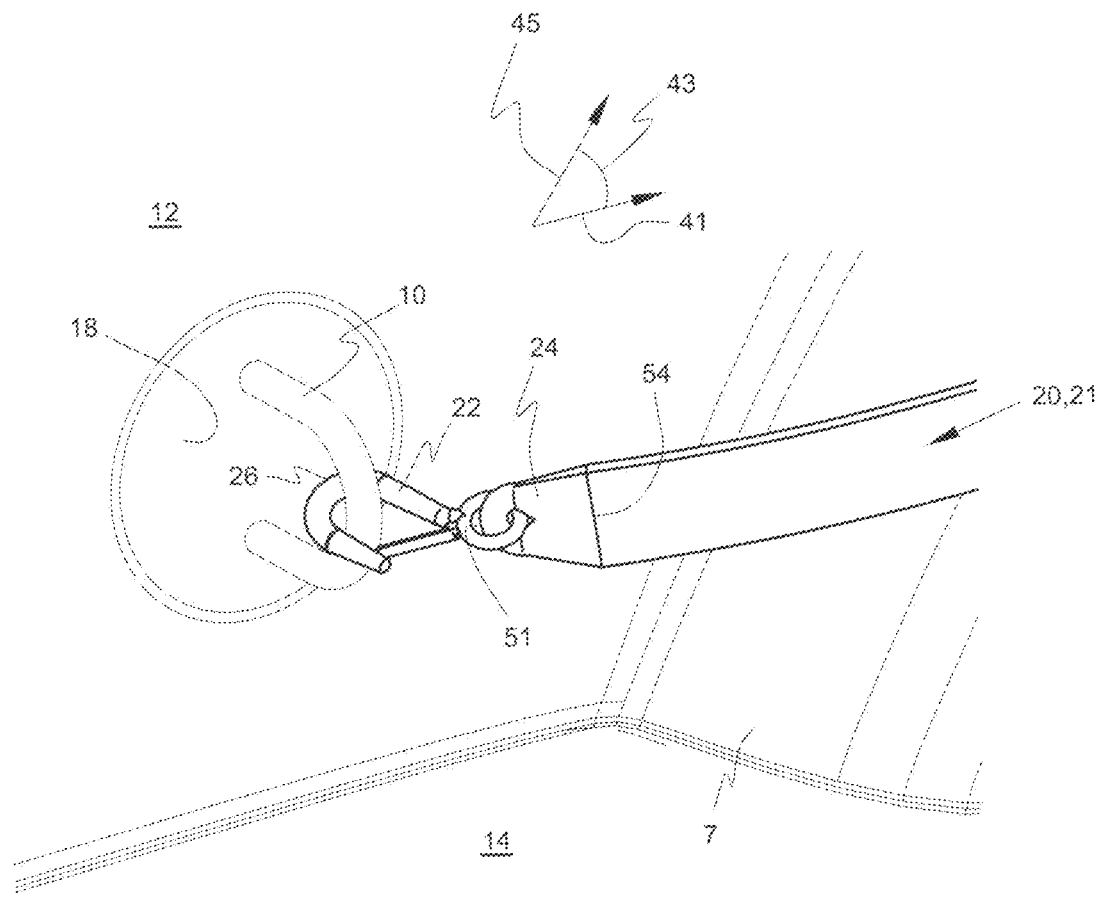
FIG. 3 perspective view of the end portion of the strap member of FIG. 2a detachably secured to a cargo ring, which is secured to a structural portion of an inner side wall of the pickup truck.

After the cross straps 38 are forcibly stretched, the midportions 28 of the strap members 20 and 21 are positioned a predetermined distance from the inner side walls 12 of the pickup truck 16; whereby, the force (or force vector 41, see FIG. 3) imparted upon the end portions 24 of the strap members 20 and 21 forms and angle 43 of about forty degrees between the end portions 24 and the inner side walls 12 of the truck 16. The force imparted upon the angularly disposed end portions 24 of the strap members 20 and 21 is transferred to the cargo rings 10 and 11, but the forty degrees angle reduces the force urging the cargo rings 10 and 11 together via a force vector 45 parallel with the side walls 12 of the truck 16. Prior art strap members are substantially parallel to the side walls 12 when forcibly secured to the cargo rings 10 and 11, thereby increasing the force parallel to the side walls 12 that urges the cargo rings 10 and 11 together. The angle 43 can be reduced to about thirty degrees when the cargo boxes 40 are relatively larger than depicted in FIG. 1 and disposed closer to the side walls 12.

Further, the connecting hooks 22 are rigidly connected (not ratchet connected as prior art devices) to the strap members 20 and 21, thereby preventing the connecting hooks 22 from releasing the strap members 20 and 21 from the cargo rings 10 and 11, irrespective of the force generated by the cross straps 38 connected to the strap members 20 and 21. The adjustable length of ratchet straps included in prior art devices are capable of "slipping," resulting in a sudden release of the tension generated by the ratchet for restrained cargo boxes 40, and correspondingly allowing movement of the cargo boxes 40 that can damage the inner side walls 12 of the pickup truck 16 and/or cause injury to the driver of the pickup truck 16.

The strap members 20 are fabricated from multilayered yellow nylon/polyester strap material, wire rope, wire cable, metal link chain, rope, synthetic webbing, combinations thereof and other materials well known to those of ordinary skill in the art. The strap rings 30 and 32 are fabricated from steel having a diameter of at least one-quarter inch. The strap rings 30 and 32 configurations can be annular but a "D" configuration is preferred, whereby, a linear base portion 46 of the strap rings 30 and 32 is engaged and retained between adjacent layers 47 and 48 of the strap members 20 via industrial grade threading after disposing all strap rings at selected locations between the two adjacent layers 47 and 48, resulting in strap rings 30 and 32 having an arcuately configured retaining loop 50 with an aperture 52 sufficiently large for receiving one layer 48 of a strap member 20 and hook configured ends 36 of multiple cross straps 38. The D configuration is maintained irrespective of the force generated by multiple cross straps being detachably secured to said strap rings 30 and 32. The retaining loops 50 of the strap rings 30 are dimensioned to separate the hook ends 36 of the cross straps 38 from the strap member 20 a distance that prevents the hook ends 36 of the cross straps 38 from engaging and damaging the strap members 20.

The linear base portions 46 of the "D" configuration of the strap rings 30 and 32 are secured between the two adjacent layers 47 and 48 of the strap members 20 and 21, thereby enabling the strap members 20 and 21 to be disposed in a substantially vertical position after being connected to the cargo rings 10 and 11. The vertical position of the strap members 20 and 21 results in the base portions 46 and the arcuately configured retaining loops 50 of the strap rings 30 and 32 being disposed substantially vertical; whereby, the "peaks" 53 of the arcuately configured retaining loops 50 are substantially horizontally aligned with and separated from a center line of the strap members 20 and 21, thereby maintaining a consistent force from each cross strap 38 urged upon a cargo box 40, irrespective of the hook ends 36 becoming angularly orientated relative to the strap rings 30 and 32 when the cross straps 38 forcibly engage a cargo box 40.

The peaks 53 of the strap rings 30 and 32 detachably receive the hook configured end portions 36 of cross straps 38 without causing the strap members 20 and 21 or the cross straps 38 to twist or rotate, due to the strap rings 30 and 32 separating the end portions 36 of the cross straps 38 from the strap members 20 and 21. This feature differentiates the present invention from the prior art which includes having the end portions 36 of the cross straps 38 engage apertures in the strap members detachably joined to the cargo rings 10 and 11. Preventing the strap members 20 and 21 and cross straps 38 from twisting, correspondingly reduces damage to the strap members 20 and 21, and maintains the entire surface area of the cross straps 38 upon the top portions 42 of the cargo boxes 40, thereby increasing the total force urging the bottom portions 44 of the cargo boxes 40 upon the bed 14 of the pickup truck.

The connecting hooks 22 are fabricated from steel and include an aperture 51 for receiving an end portion 24 of a strap member 20 and 21. The end portion 24 of the strap member 20 and 21 is inserted though the aperture 51, then folded and secured via industrial thread 54, or similar means well known to shoes of ordinary skill in the art, upon an opposing wall portion of the strap member 20 and 21. The strap members 20 and 21 remain attached to the connecting hooks 22, irrespective of the force generated by the cross straps 38 upon the cargo boxes 40 and strap members 20 and 21 when the pickup truck 16 is moving, thereby preventing cargo boxes 40 from moving vertically or horizontally upon the bed 14 of the pickup truck 16.

Figure 5:
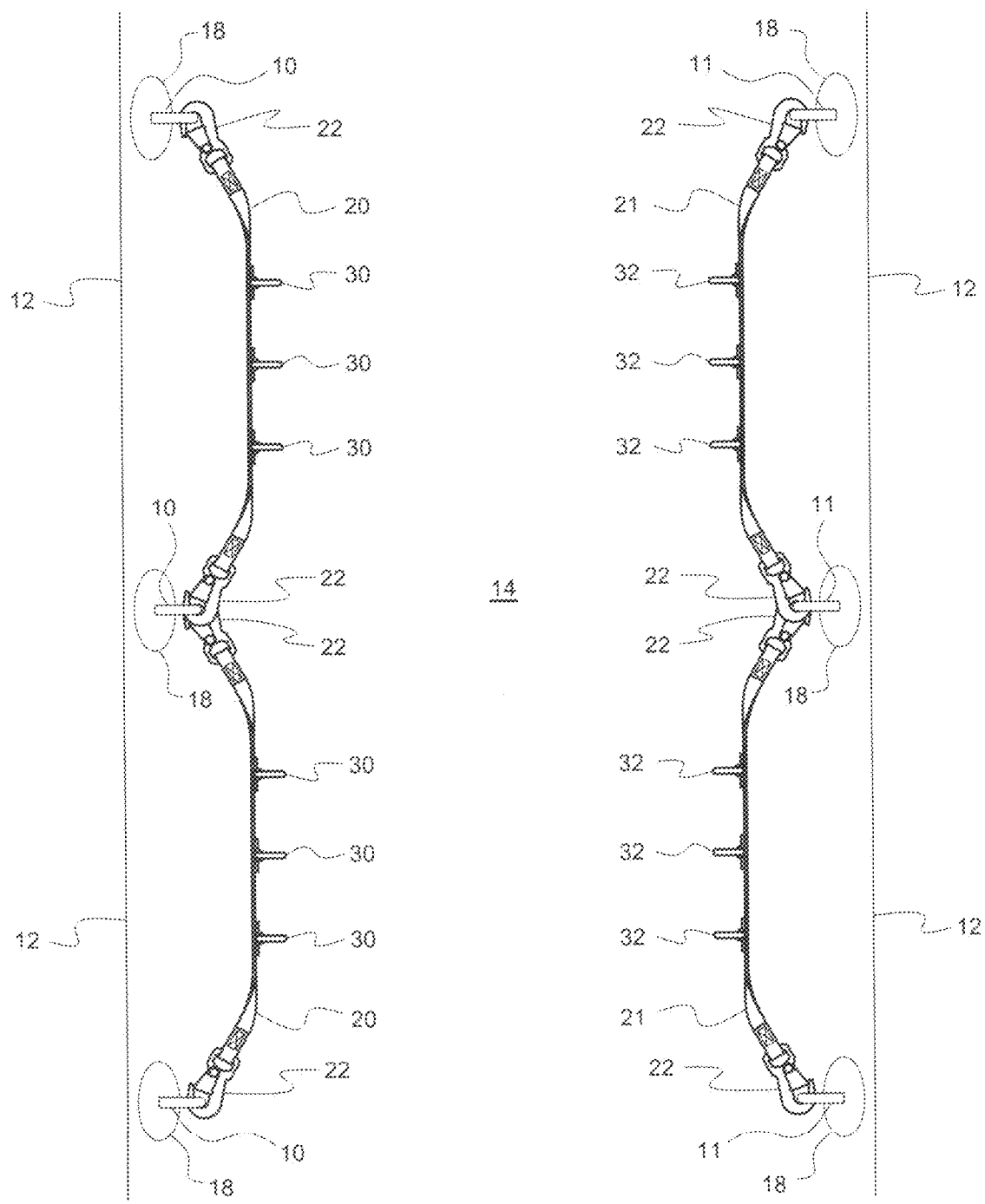
FIG. 5 is a top view of two longitudinally aligned strap members for each side wall of a truck secured to three linearly aligned cargo rings when operating trucks having a bed or floor dimensions relatively longer than the bed of a pickup truck.

Although the preferred method for securing cargo boxes 40 in the bed 14 of a pickup truck 16 includes the step of securing a pair of cargo rings 10 and 11 to a structural portion 18 of each inner side wall 12 of a pickup truck 16 when the cargo rings 10 and 11 are not factory installed by the manufacturer of the truck 16; an alternative method for securing cargo boxes 40 upon a bed or floor 14 of a truck 16 includes installing two longitudinally aligned strap members 20 and two longitudinally aligned strap members 21, each strap member 20 and 21 is secured to three linearly aligned cargo rings 10 and 11 (see FIG. 5) when operating trucks 16 having a bed or floor 14 dimensions relatively longer than the bed 14 of a pickup truck 16. Three linear aligned cargo rings 10 and 11 for each side wall 12 can be increased when the scope of the method requires more than three cargo rings 10 and 11 secured to each inner side wall 12, when trucks 16 are encountered with attached trailers having substantially greater lengths than the lengths of inner side walls 12 requiring three lineally aligned cargo rings 10 and 11 for each side wall 12.

The remaining steps of the method for securing cargo boxes 40 to the bed or floor 14 of a truck 16 longer than a pickup truck includes:
    determining the distance separating adjacent cargo rings 10 and 11 secured to each inner side wall 12 of the truck 16;
    providing strap members 20 and 21 having connecting hooks 22 secured to each end portion 24 of each strap member 20 and 21, whereby, the longitudinal length between end portions 26 of each connecting hook 22 is longer than the distance separating adjacent cargo rings 10 and 11 secured to each inner side wall 12 of the pickup truck 16, thereby enabling each strap member 20 to be secured to adjacent cargo rings 10 and 11 secured to an inner side wall 12 of the truck 16 via said connecting hooks 22 secured to adjacent cooperating cargo rings 10 and 11, resulting in each strap member 20 and 21 having a midportion 28 of the strap member 20 and 21; and
    securing a preselected quantity of strap rings 30 and 32 to each respective strap member 20 and 21, each strap ring 30 and 32 being separated a predetermined distance from an adjacent strap ring 30 and 32, whereby, strap rings 30 secured to the first strap member 20 and strap rings 32 secured to the opposing second strap member 21 detachably receive end portions 36 of adjustable length cross straps 38 that engage top portions 42 of cargo boxes 40 disposed upon the bed or floor 14 of the truck 16; whereupon, the cross straps 38 lengths are forcibly adjusted until the cross straps 38 generate sufficient tensile force that removes the sag from the midportion 38 of the strap members 20 and 21, resulting in the cross straps 38 forcibly engaging the top portions 42 of the cargo boxes 40 and correspondingly urging bottom portions 44 of the cargo boxes 40 upon the bed or floor 14 of the truck 16, thereby maintaining the position of the cargo boxes 40 upon the bed or floor 14 of the truck 16.

Figure 6:
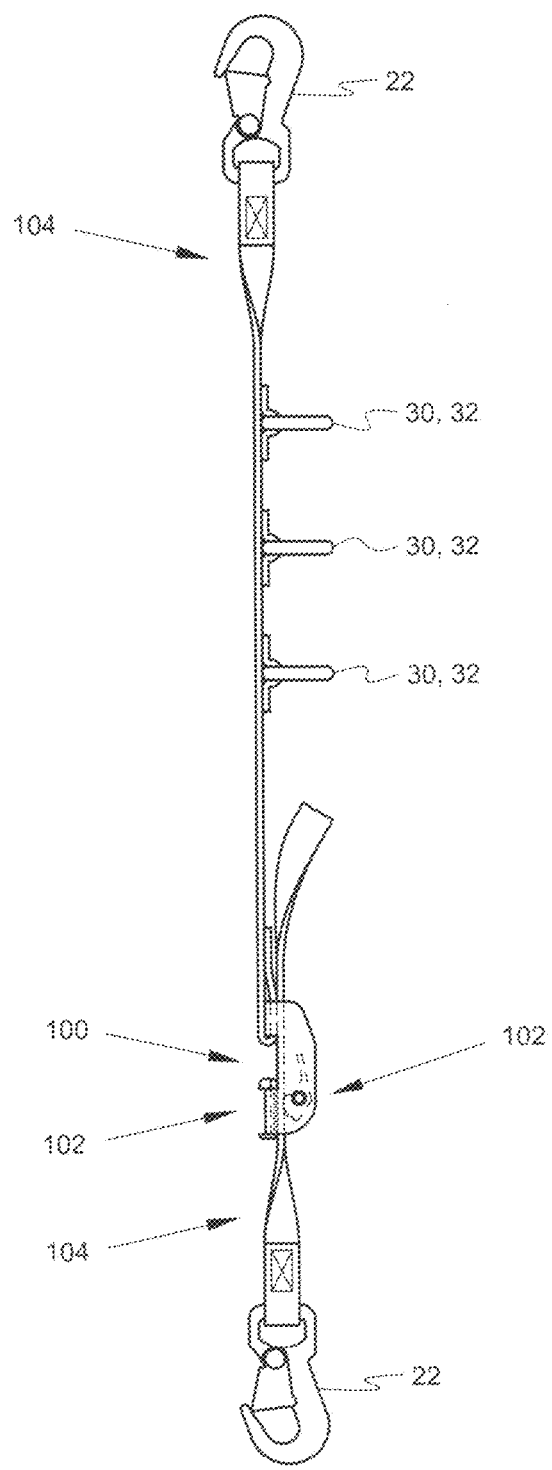
FIG. 6 is a side elevation view of a prior art method of using a ratchet connector to adjustably secure strap members to side walls of a pickup truck.
Figure 7:
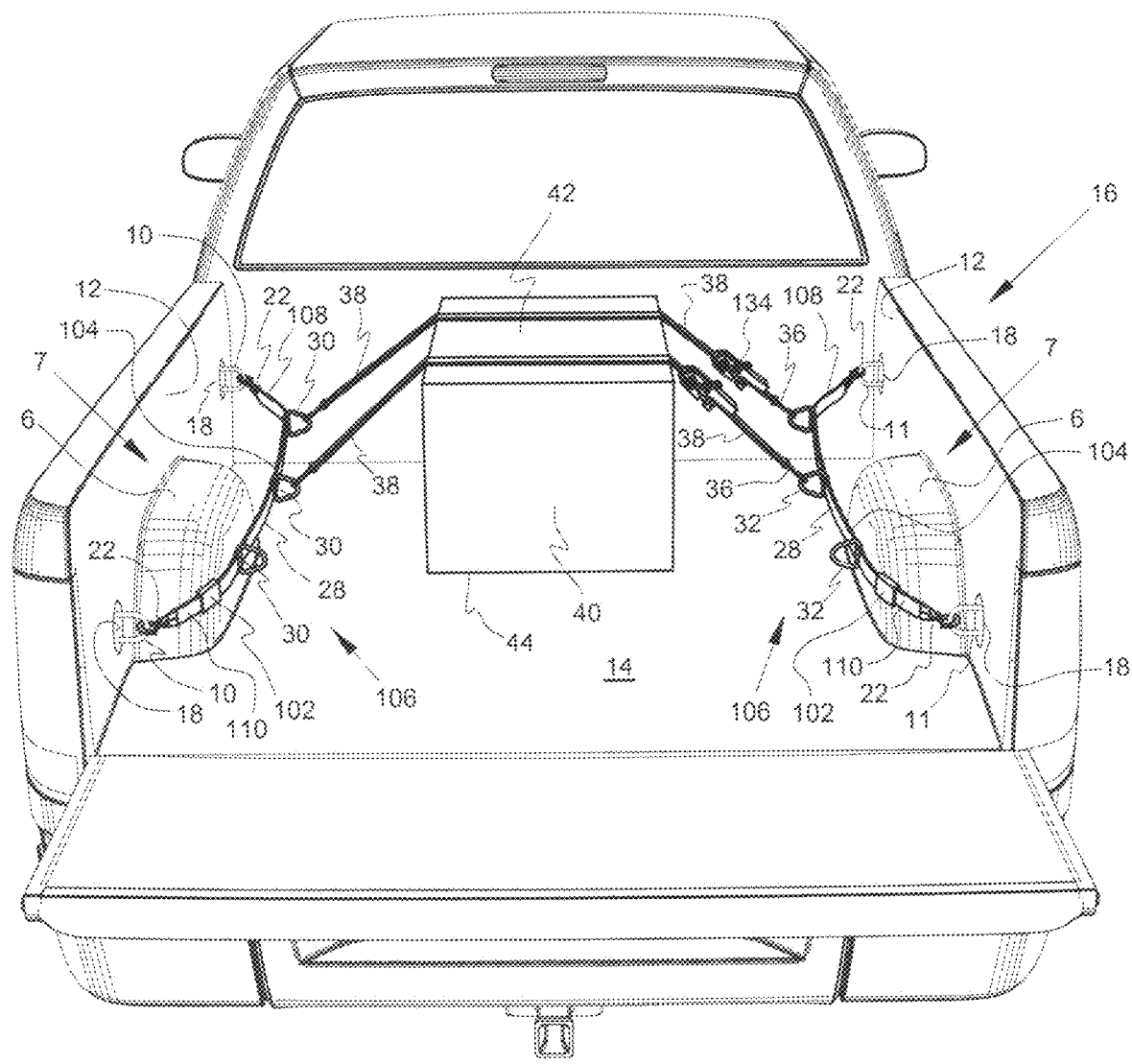
FIG. 7 is the back perspective view of FIG. 1, but with the pickup truck having an alternative device and method for securing cargo boxes upon the bed of the pickup truck in accordance with the present invention.

Referring now to FIG. 6, a side elevation view of a prior art method and device 100 that uses a "slide" tie-down connector 102 to adjustably secure strap members 104 to side walls 12 (see FIG. 7) of a pickup truck 16 is depicted.

Referring to FIGS. 7-11, an alternative method and device 106 for securing cargo boxes 40 upon the bed 14 of a pickup truck 16 in accordance with the present invention includes an adjustable length strap member denoted as numeral 104 with at least one strap member 104 detachably secured to each inner side wall 12 of the pickup truck 16 via connecting hooks 22 (well known to those of ordinary skill in the art) detachably secured to cooperating cargo rings 10. Each strap member 104 includes a first portion 108 having a hook end 112 integrally secured (via industrial thread, for example) to a connecting hook 22, and a cam buckle end 114 integrally secured to a first end 116 of a slide tie-down connector 102, preferably a cam buckle but a ratchet type tie-down connector or similar connectors can also be used.

Figure 8:
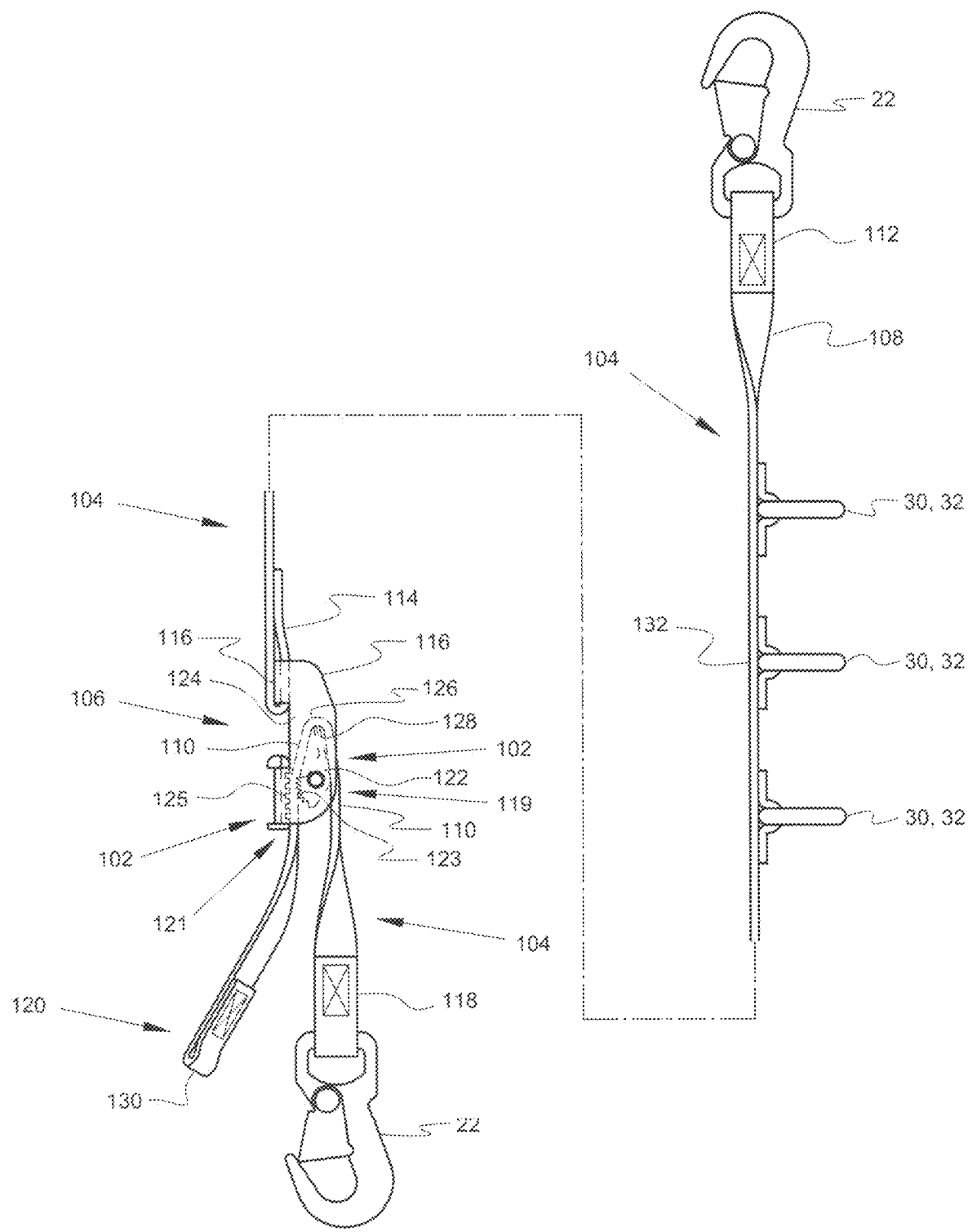
FIG. 8 is a side elevation view of an alternative method and device for using a cam buckle to adjustably secure a first and second portions each strap member to cooperating cargo rings secured to side walls of a pickup truck, whereby an increasing tensile force imparted upon each strap member correspondingly increases the grasping force of the cam buckle upon the second portion of each strap member in accordance with the present invention.
Figure 8A:
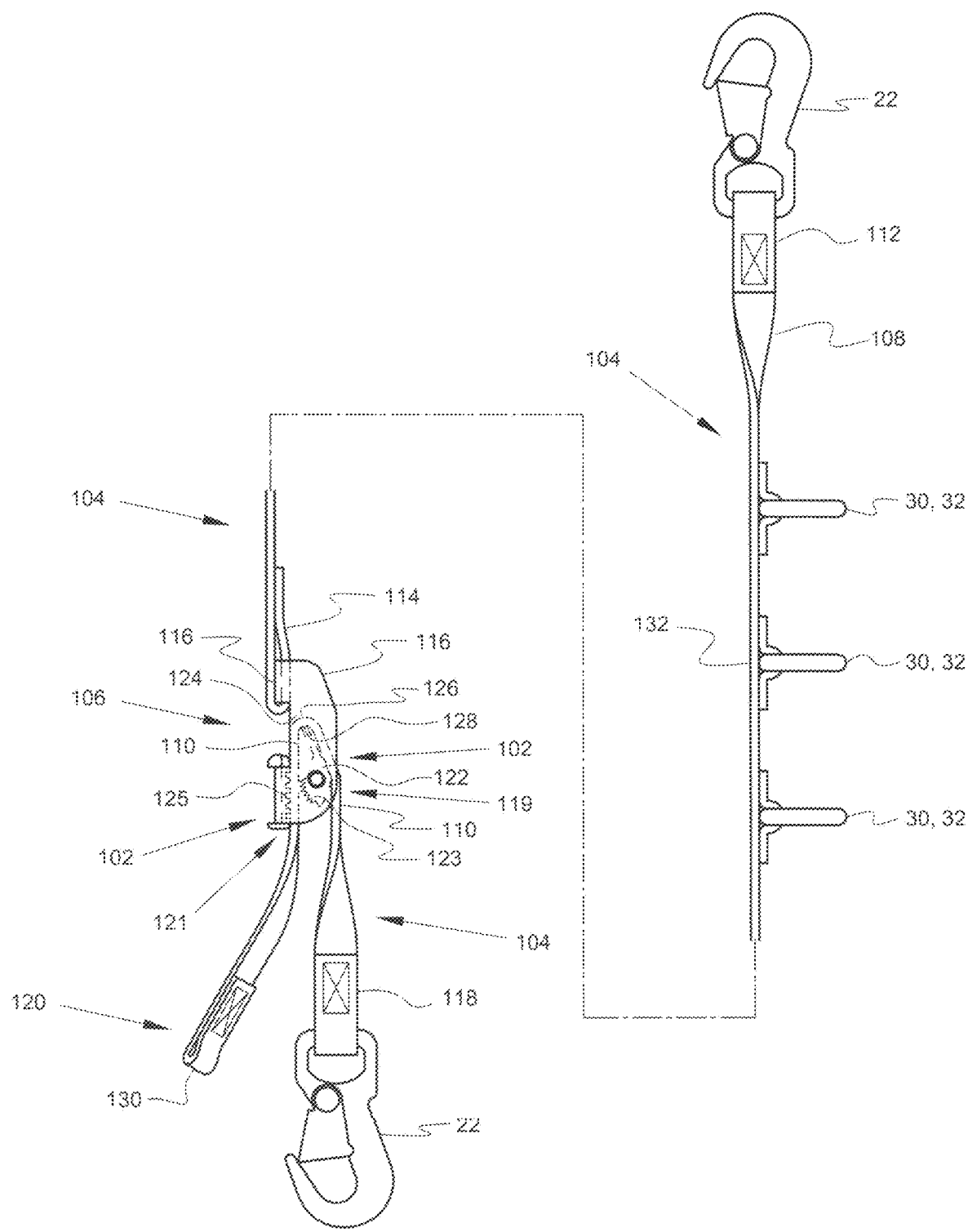
FIG. 8A is the same side elevation view of FIG. 8, but depicting pivot portion teeth and base portion teeth of the cam buckle being separated.

Referring to FIGS. 8 and 8A, each strap member 104 further includes a second portion 110 having a hook end 118 integrally secured to a connecting hook 22, and having a cam buckle end 120 that inserts through an input aperture 119 in a base portion 124 of the cam buckle 102 and continues through the cam buckle 102 until exiting the base portion 124 via an output aperture 121, whereupon the cam buckle end 120 is folded over to form and end portion 130. The folded end portion 130 cooperates with the connecting hook 22 integrally secured to the hook end 118 of the second portion 110 to prevent the user from mistakenly pulling on the hook end 118 and extracting the second portion 110 from the cam buckle 102. Although the connecting hook 22 is preferably attached to the hook end 118 before the cam buckle end 120 of the second portion 110 is inserted into the cam buckle 102, the connecting hook 22 can be integrally secured to the hook end 118 after the cam buckle end 120 exits the cam buckle 102.

After the insertion of the cam buckle end 120 of the second portion 110 into the cam buckle 102 input aperture, the cam buckle end 120 is slidably urged about an arcuate end portion 128 of a spring biased pivot portion 122 manually positioned, whereby pivot portion teeth 123 are separated from base portion teeth 125 of the cam buckle 102, thereby enabling the second portion 110 to form a loop portion 126 about and frictionally engaging the arcuate end portion 128 of the pivot portion 122 and allowing the cam buckle end 120 of the second portion 110 to exit the cam buckle 102. The manually positioned pivot portion 122 is ultimately released resulting in the pivot portion 112 returning to its non-biased position and the pivot portion teeth 123 and base portion teeth 125 engaging opposite sides of the second portion 110 of the strap member 104. The connecting hooks 22 secured to the first and second portions 108 and 110 of each strap member 104 are detachably secured to cooperating cargo rings 10 and 11 secured to inner side walls 12 of a pickup truck 16; the first portion 108 detachably receiving cross straps 38 that maintain the position of cargo boxes 40 upon the bed 14 of the pickup truck 16.

Further, as the tensile force exerted upon the first portion 108 via the cross straps 38 increases, the second portion 110 is subjected to a tensile force that rotationally urges the loop portion 126 upon the end portion 128 of the pivot portion 122 of the cam buckle 102; whereby, the loop portion 126 forcibly grips and rotates the arcuate end portion 128 of the pivot portion 122, resulting in the second portion 110 rotationally urging the pivot portion 122 in a direction opposite from the said base portion teeth 125, thereby urging the pivot portion teeth 123 into a corresponding side of the second portion 110 and urging the opposite side of the second portion into the base portion teeth 125 that "bite" into the second portion 110 of each strap member 104. The urging of the pivot portion teeth 123 and the base portion teeth 125 into the second portion 110 increases the "grasp" of the cam buckle 102 upon the second portion 110 and correspondingly decreasing the "slippage" of the second portion 110 back through the input aperture of the cam buckle 102. Maintaining the position of the second portion 110 relative to the cam buckle 102, correspondingly maintains the position of the cargo boxes 40 upon the bed 14 of the pickup truck 16, irrespective of road conditions and/or the speed of the pickup truck 16.

Figure 7A:
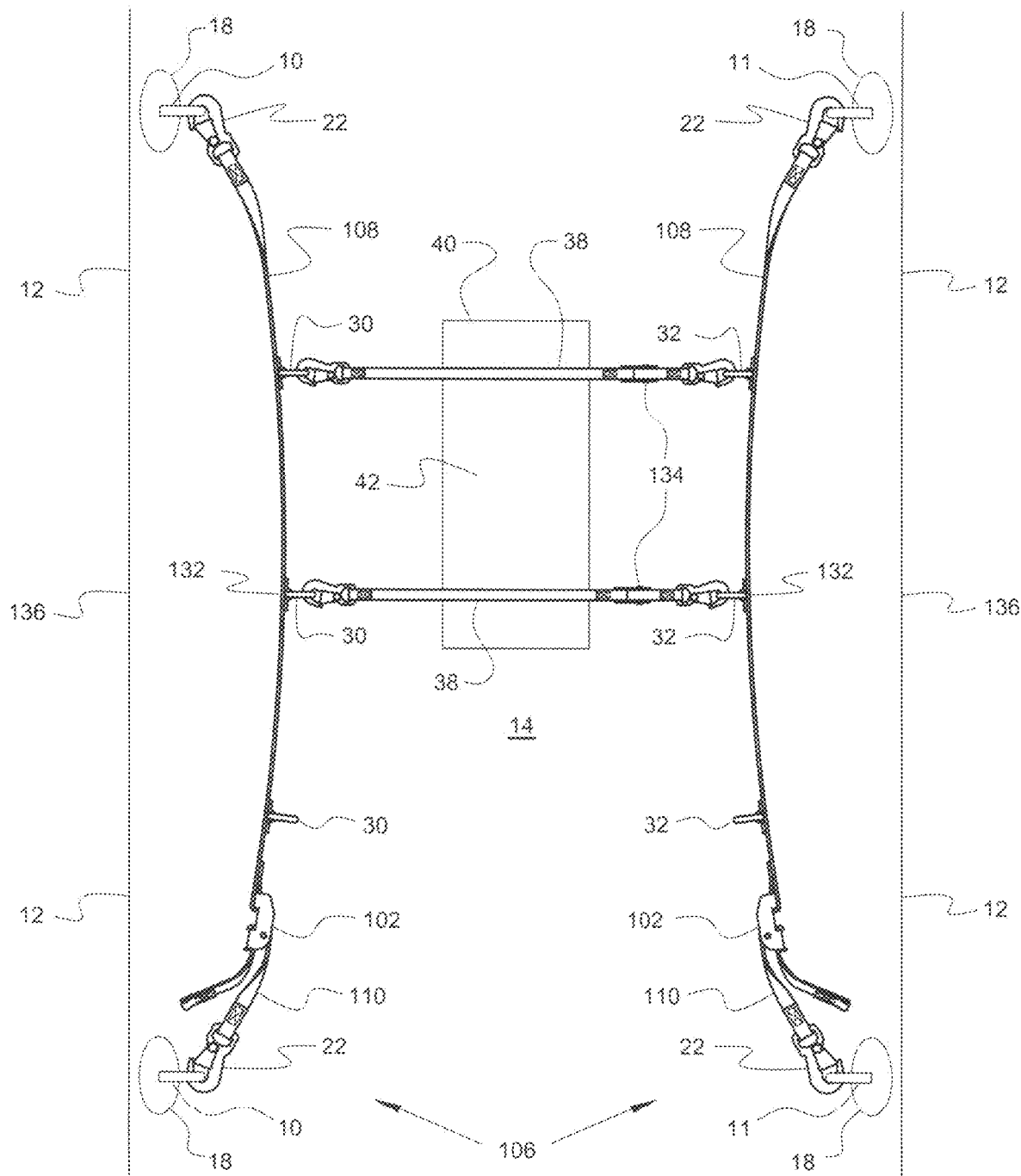
FIG. 7A is a top view of FIG. 7, but with only the strap members secured to cargo rings secured to side walls of the pickup truck, the strap members engaging a top portion of the cargo box.

The first portion 108 of the adjustable strap members 104 includes a longitudinal dimension relatively greater than the longitudinal dimension of the second portion 110. The cam buckle 102 enables a user to select a second portion 110 length that provides an optimal distance (typically eight inches) separating a proximate mid-portion 132 of the first portion 108 of the adjustable strap member 104 perpendicularly from an inner side wall 12 of the truck 16 (when taking a top view (FIG. 7A) of FIG. 7) and at a proximate midpoint 136 between respective cargo rings 10 and 11; whereby, a force vector 45 parallel to the side wall 12 is minimized, the force vector 45 being generated via cross straps 38 detachably connected to solid steel arcuately configured one-half inch diameter strap rings 30 and 32 integrally joined to the first portion 108 described supra and depicted in FIG. 4 with the first portion 108 substituting for strap members 20 and 21.

The cross straps 38 generate the force vector 45 as a component of the tensile force vector 41 (see FIGS. 9-11) generated via the first portions 108 forming an acute angle 43 with an inner side wall 12 as the cross straps 38 pull the adjustable strap members 104 together via the manually operated ratchet members 134. Minimizing the force vector 45 minimizes the force urging together respective cargo rings secured to the side walls of the pickup truck 16, thereby preventing movement of the cargo boxes 40 upon the bed 14 of the pickup truck and/or the bending or extraction of the cargo rings 10 and 11 from the structural portion 18 of the pickup truck 16.

Figure 2A:
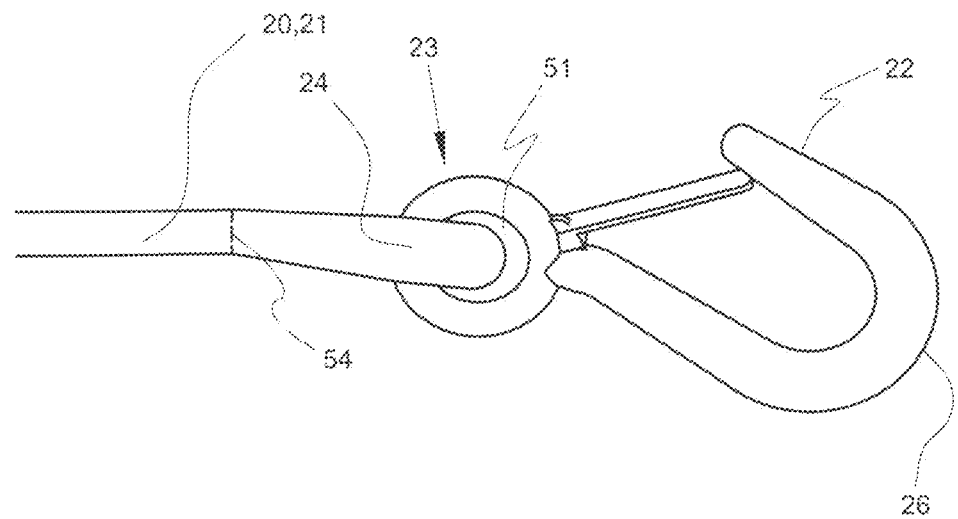
FIG. 2a is a side elevation view of an end portion of a strap member having a connecting hook with an annular base attached thereto.
Figure 2B:
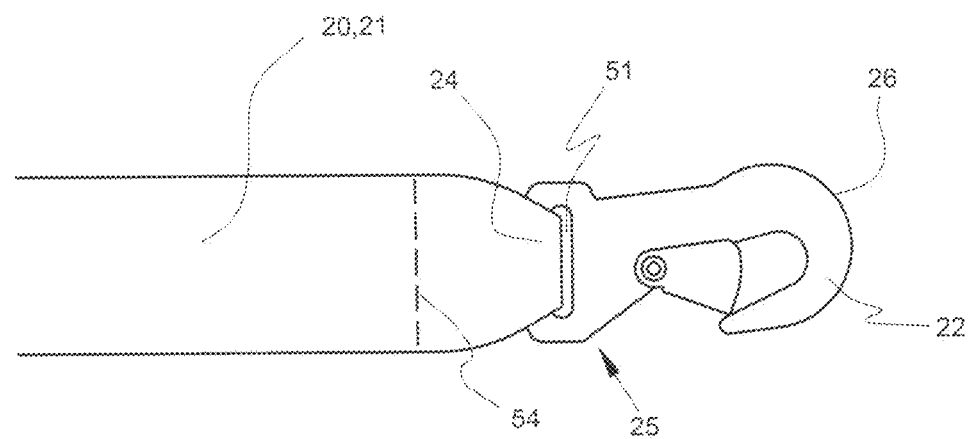
FIG. 2b is a side elevation view of an end portion of a strap member having a connecting hook with a rectangular base attached thereto.

The adjustable strap members 104 include substantially the same elements as the method and device 8 depicted in FIG. 1, except that the cam buckle 102 has been added to adjust the length of the first portion 110 of the strap members 104 to adjustably secure the strap members 104 to the cargo rings 10 and 11 via connection hooks 22, thereby enabling a user to select an optimal distance for separating predetermined midportions 28 of the straps members 104 from an inner side wall 12 of the pickup truck 16. The adjustable strap members 104 further include multiple strap rings 30 and 32 (preferably three for each strap member 104) integrally secured to the relatively longer first portion 108 of each strap member 104 for detachably receiving end portions 36 of cross straps 38 that ultimately secure cargo boxes 40 upon the bed 14 of the pickup truck 16. The strap rings 30 and 32 are equally spaced apart with a center strap ring integrally secured to the mid-portion 132 of each first portion 108 of each strap member 104. The preferred cam buckle 102 and strap member 104 combination is manufactured by SECURE-A-LOAD-.COM, located in Highland, Indiana. The part number for the combination is 4207-6579Y having an assembly break strength of 1,760 lbs. (798 kg).

In operation, a user must determine the distance separating cargo rings 10 and 11 secured to side walls of a truck hauling cargo boxes 40. The truck can include but not limited to pick-up trucks, tractor trailer trucks and box trucks. The user must then select strap members having a longitudinal dimension greater than the distance separating the cargo rings 10 and 11 secured to respective inner side walls of the truck 16. The user must estimate a predetermined length for the second portions 110 of the strap members 104 after positioning cargo boxes 40 upon the bed 14 of the truck 16, whereby the strap rings 30 and 32 integrally secured to the first portions 108 of the strap members 104 are positioned proximate to the cargo boxes 40. The user will then position a mid-portion 132 of the strap first portion 108 whereby the distance (preferably about eight inches) separating the mid-portion 132 from inner side walls 12 of the truck 16 minimizes the tensile force vector extending parallel to a corresponding side wall 12 of the truck 16. Further, the user must adjust the position of the second portions 110 of the strap members 104, whereby the first portions 108, and the mid-portions 28 maintain proximate positions relative to the cargo boxes 40 when the cross straps 38 forcibly engage the cargo boxes 40 as the cross straps 38 are forcibly secured to the strap rings 30 and 32 by reducing the length of each cross strap 38, resulting in cross strap 38 tensile forces being imparted upon the cam buckles 102 and adjustable strap members 104 to secure the position of the cargo boxes 40 upon the bed 14 of the pickup truck 16.

Further, after initially securing the strap members 104 and cross straps 38 as described above, the user may be required to re-adjust the positions of the second portions 110 of the strap members 104 via the cam buckles 102 in the event that the oppositely positioned first portions 108 are not longitudinally proximate to the cargo boxes 40, resulting in the cross straps 38 not engaging all the cargo boxes 40. To correct this problem, the user can slidably adjust the longitudinal dimension of the second portions 110 of the strap members 104 via the cam buckle 102, whereby the first portions 108 and strap rings 30 and 32 are repositioned to enable the cross straps 38 to engage all the cargo boxes 40, and whereby the midportions 132 of the first portions 108 are separated a distance from the side walls 12 that reduces the tensile force extending parallel to the side walls 12 and imparted upon each strap member 104.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A Method for securing cargo boxes upon a bed of a pickup truck, said method comprising the steps of:

determining the distance separating cargo rings secured to each inner side wall of a pickup truck;

providing at least two strap members each having a first portion integrally secured to a cam buckle and a second portion slidably secured to said cam buckle, said each first portion including a hook end integrally secured to a connecting hook, said each second portion Including a hook end integrally secured to a connecting hook, said each first portion having a relatively greater longitudinal dimension than said second portion;

positioning said second portion of each said strap member, whereby, the longitudinal dimension between end portions of said connecting hook secured to said hook end of said first portion and said connecting hook secured to said hook end of said second portion is greater than the distance separating corresponding cargo rings secured to a respective inner side wall of the pickup truck, thereby enabling each strap member to be ultimately secured to a corresponding inner side wall of the pickup truck via said connecting hooks secured to cooperating cargo rings, resulting in each strap member having a sag proximate to a midportion of said first portion of said each strap member; and securing a preselected quantity of strap rings to each first portion of each said strap member, each strap ring being separated a predetermined distance from an adjacent strap ring, whereby, opposing strap rings secured to opposing strap members detachably receive end portions of adjustable length cross straps that engage top portions of cargo boxes disposed in the bed of the pickup truck; whereupon, the cross straps lengths are forcibly adjusted until the cross straps generate sufficient tensile force that removes said sag from said strap members, resulting in the cross straps forcibly engaging top portions of the cargo boxes and correspondingly urging bottom portions of the cargo boxes upon the bed of the pickup truck, thereby maintaining the position of the cargo boxes upon the bed of the pickup truck.

2. The Method of claim 1 wherein said sag at a proximate midportion of said each first portion distally positions said strap members from corresponding inner side walls of the pickup truck, thereby increasing the angle of force imparted upon the cargo rings secured to the inner side walls of the pickup truck, and correspondingly reducing a force vector extending parallel to the side walls urging the cargo rings together.

3. The method of claim 2 wherein said force vector is parallel to a side wall of the pickup truck and is generated via cross straps detachably connected to said strap rings integrally joined to said first portion.

4. The method of claim 3 wherein said force vector is generated as a component of tensile force generated via said first portions forming an acute angle with an inner side wall of the cross straps pulling said strap members together via manually operated ratchet members.

5. The Method of claim 1 wherein said connecting hooks include a rectangular portion for receiving said end portion of said strap members, said end portion of said strap members being folded and secured upon an inner portion of said strap member, whereby, said strap members remain attached to said connecting hooks irrespective of the force generated by the cargo boxes upon said cross straps and correspondingly upon said strap members when the pickup truck is moving, thereby preventing cargo boxes from moving upon the bed of the pickup truck.

6. The Method of claim 1 wherein said step of securing a preselected quantity of strap rings to said strap members includes the step of disposing said strap rings between adjacent layers of said strap members, whereby, one layer of said strap member inserts through an aperture in said strap rings.

7. The Method of claim 6 wherein said strap rings are D configured and secured to said strap member, whereby, a base portion of said strap rings is engaged and retained between layers of said strap members, resulting in a strap ring retaining loop sufficiently large for receiving multiple cross strap ends, said retaining loop separating said cross strap ends from said strap, member a distance sufficient to prevent said cross strap ends from engaging and damaging said strap members.

8. The Method of claim 7 wherein said strap ring D configuration is maintained irrespective of the force generated by multiple cross straps being detachably secured to said strap ring.

9. The Method of claim 8 wherein one strap ring secured to a first strap member detachably receives multiple cross straps connected to multiple strap rings secured to a second strap member.

10. The Method of claim 1 wherein said connecting hooks include an annular portion for receiving said end portion of said strap members, said end portion of said strap members being folded and secured upon an inner portion of said strap member, whereby, said strap members remain attached to said connecting hooks irrespective of the force generated by the cargo boxes upon the said cross straps and correspondingly upon said strap members when the pick-up truck is moving, thereby preventing cargo boxes from moving upon the bed of the pickup truck.

11. The Method of claim 10 wherein the step of providing strap members includes the step of integrally joining a swivel between said annular portion of said connecting hook and said end portion of said strap members; whereby said annular portion and said strap members are free to rotate to any position, resulting in said strap members rotating from a vertical orientation to an angled position that cooperates with cross straps angularly extending from a top wall of a cargo box, when cross straps are secured to the strap rings and a tensile force is urged upon said cross straps.

12. The Method of claim 1 wherein said adjustable length cross straps include ratchet straps, bungee cords, ropes and combinations thereof.

13. The method of claim 1 wherein said first portion includes a cam buckle end integrally secured to a first end of said cam buckle, said second portion including a cam. buckle end slidably inserted in and exiting from said cam buckle, whereupon, said cam buckle end is folded over to form an end portion that cooperates with said connecting hook secured to said hook end of said second portion to prevent said second portion from being extracted from said cam buckle.

14. The method of claim 13 wherein said second portion after being inserted into a cam buckle input aperture includes the step of slidably urging said second portion about an arcuate end portion of a spring biased pivot portion manually positioned, whereby pivot portion teeth are separated from base portion teeth of a base portion of said cam buckle, thereby enabling said second portion to form a loop portion about said arcuate end portion of said pivot portion and allowing said cam buckle end of said second portion to exit said cam buckle.

15. The method of claim 14 wherein said second portion urged about said arcuate end portion of said pivot portion forms a loop in said second portion that ultimately and forcibly grips said arcuate end portion, whereby said loop portion maintains engagement with said arcuate end portion when said pivot portion is rotationally urged in a direction opposite from said base portion teeth.

16. The method of claim 15 wherein said manually positioned pivot portion includes the step of manually releasing said pivot portion, resulting in said pivot portion returning to a non-biased position and said pivot portion teeth and said base portion teeth engaging opposite sides of said second portion.

17. The method of claim 16 wherein said pivot portion teeth and said base portion teeth engaging opposite sides of said second portion, results in said teeth forcibly engaging corresponding sides of said second portion when said arcuate end portion of said pivot portion is rotationally urged in a direction opposite from said base portion teeth, thereby increasing the grasp of said cam buckle upon said second portion and correspondingly decreasing the slippage of said second portion in a reverse direction through said input aperture.

18. The method of claim 17 wherein said pivot portion teeth and said base portion teeth engaging opposite sides of said second portion maintains the position of said second portion relative to said cam buckle, thereby correspondingly maintaining the position of the cargo boxes upon the bed of the pickup truck, irrespective of road conditions and/or the speed of the pickup truck.

19. A Method for Securing Cargo Boxes upon a Bed of a truck, said method comprising the steps of:
    determining the distance separating cargo rings secured to each inner side wall of a pickup truck;
    providing at least two strap members each having a first portion integrally secured to a cam buckle and a second portion slidably secured to said cam buckle, said each first portion including a hook end integrally secured to a connecting hook, said each second portion including a hook end integrally secured to a connecting hook, said first portion having a relatively greater longitudinal dimension than said second portion;
    positioning said second portion of each said strap member, whereby, the longitudinal dimension between end portions of said connecting hook secured to said hook end of said first portion and said connecting hook secured to said hook end of said second portion is greater than the distance separating corresponding cargo rings secured to a respective inner side wall of the pickup truck, thereby enabling each strap member to be ultimately secured to a corresponding inner side wall of the pickup truck via said connecting hooks secured to cooperating cargo rings, resulting in each strap member having a sag proximate to a midportion of said first portion of said each strap member, said first portion midportion sag disposed at a proximate midportion of said each first portion distally positions said strap members from corresponding inner side walls of the pickup truck, thereby increasing the angle of force imparted upon the cargo rings secured to the inner side walls of the pickup truck, and correspondingly reducing a force vector extending parallel to the side walls that urges the cargo rings together; and
    securing a preselected quantity of strap rings to each first portion of each said strap member, each strap ring being separated a predetermined distance from an adjacent strap ring, whereby, opposing strap rings secured to opposing strap members detachably receive end portions of adjustable length cross straps that engage top portions of cargo boxes disposed in the bed of the pickup truck; whereupon, the cross straps lengths are forcibly adjusted until the cross straps generate sufficient tensile force that removes said sag from said strap members, resulting in the cross straps forcibly engaging top portions of the cargo boxes and correspondingly urging bottom portions of the cargo boxes upon the bed of the pickup truck, thereby maintaining the position of the cargo boxes upon the bed of the pickup truck.

20. A Method for Securing Cargo Boxes upon a Bed of a Pickup Truck, said Method Comprising the Steps of:

determining the distance separating cargo rings secured to each inner side wall of a pickup truck;

providing at least two strap members each having a first portion integrally secured to a cam buckle and a second portion slidably secured to said cam buckle, said each first portion including a hook end integrally secured to a connecting hook, said each second portion including a hook end integrally secured to a connecting hook, said first portion having a relatively greater longitudinal dimension that said second portion;

positioning said second portion of each said strap member, whereby, the longitudinal dimension between end portions of said connecting hook secured to said hook end of said first portion and said connecting hook secured to said hook end of said second portion is greater than the distance separating corresponding cargo rings secured to a respective inner side wall of the pickup truck, thereby enabling each strap member to be ultimately secured to a corresponding inner side wall of the pickup truck via said connecting hooks secured to cooperating cargo rings, resulting in each strap member having a sag proximate to a midportion of said first portion of said each strap member; and securing a preselected quantity of strap rings to each first portion of each said strap member, said strap rings being D configured and secured to said strap members, whereby, a base portion of said strap rings is engaged and retained between layers of said strap members, resulting in a strap ring retaining loop sufficiently large for receiving multiple cross strap ends, said retaining loop separating said cross strap ends from said strap member a distance sufficient to prevent said cross strap ends from engaging and damaging said strap members, each said strap ring being separated a predetermined distance from an adjacent strap ring, whereby, opposing strap rings secured to opposing strap members detachably receive end portions of adjustable length cross straps that engage top portions of cargo boxes disposed in the bed of the pickup truck; whereupon, the cross straps lengths are forcibly adjusted until the cross straps generate sufficient tensile force that removes said sag from said strap members, resulting in the cross straps forcibly engaging top portions of the cargo boxes and correspondingly urging bottom portions of the cargo boxes upon the bed of the pickup truck, thereby maintaining the position of the cargo boxes upon the bed of the pickup truck.

* * * * *